Figure 1:
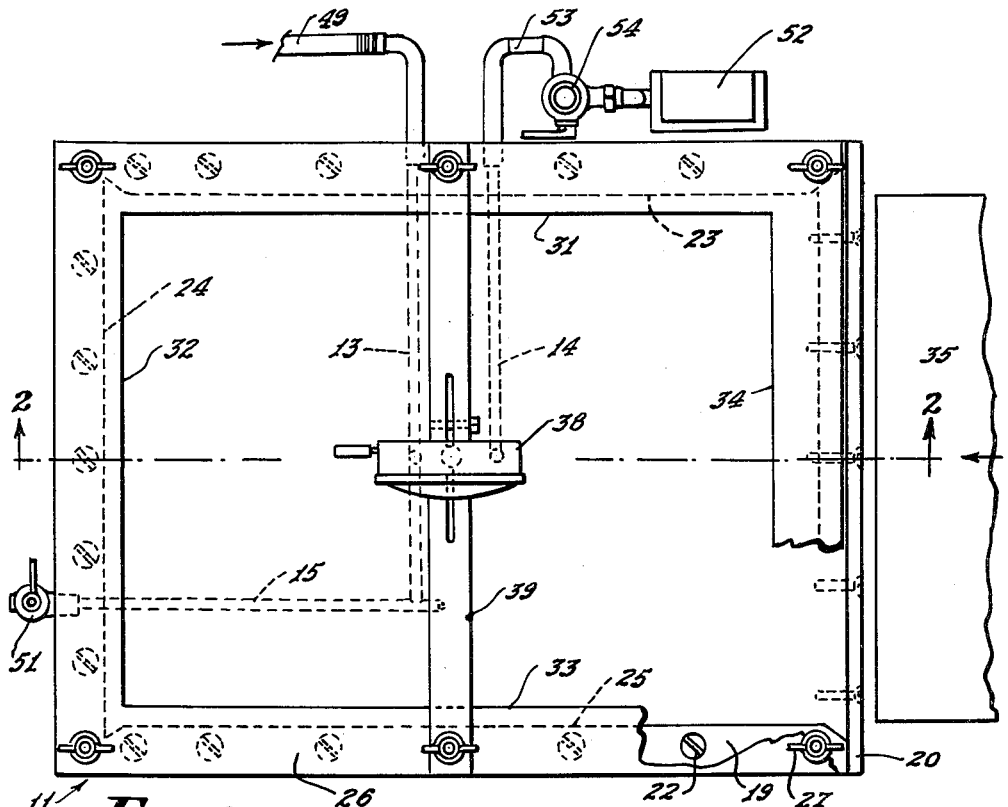

Nov. 14, 1961  P. E. COPE ET AL  3,008,328
INSTRUMENT FOR TESTING BULGE-RESISTANCE OF SHEET MATERIAL
Filed March 30, 1959  2 Sheets-Sheet 1

INVENTORS.
PAUL E. COPE AND
ALBERT G. STURDEVANT,
BY
Fredrick H. Braun.
ATTORNEYS.

Nov. 14, 1961   P. E. COPE ET AL   3,008,328
INSTRUMENT FOR TESTING BULGE-RESISTANCE OF SHEET MATERIAL
Filed March 30, 1959   2 Sheets-Sheet 2
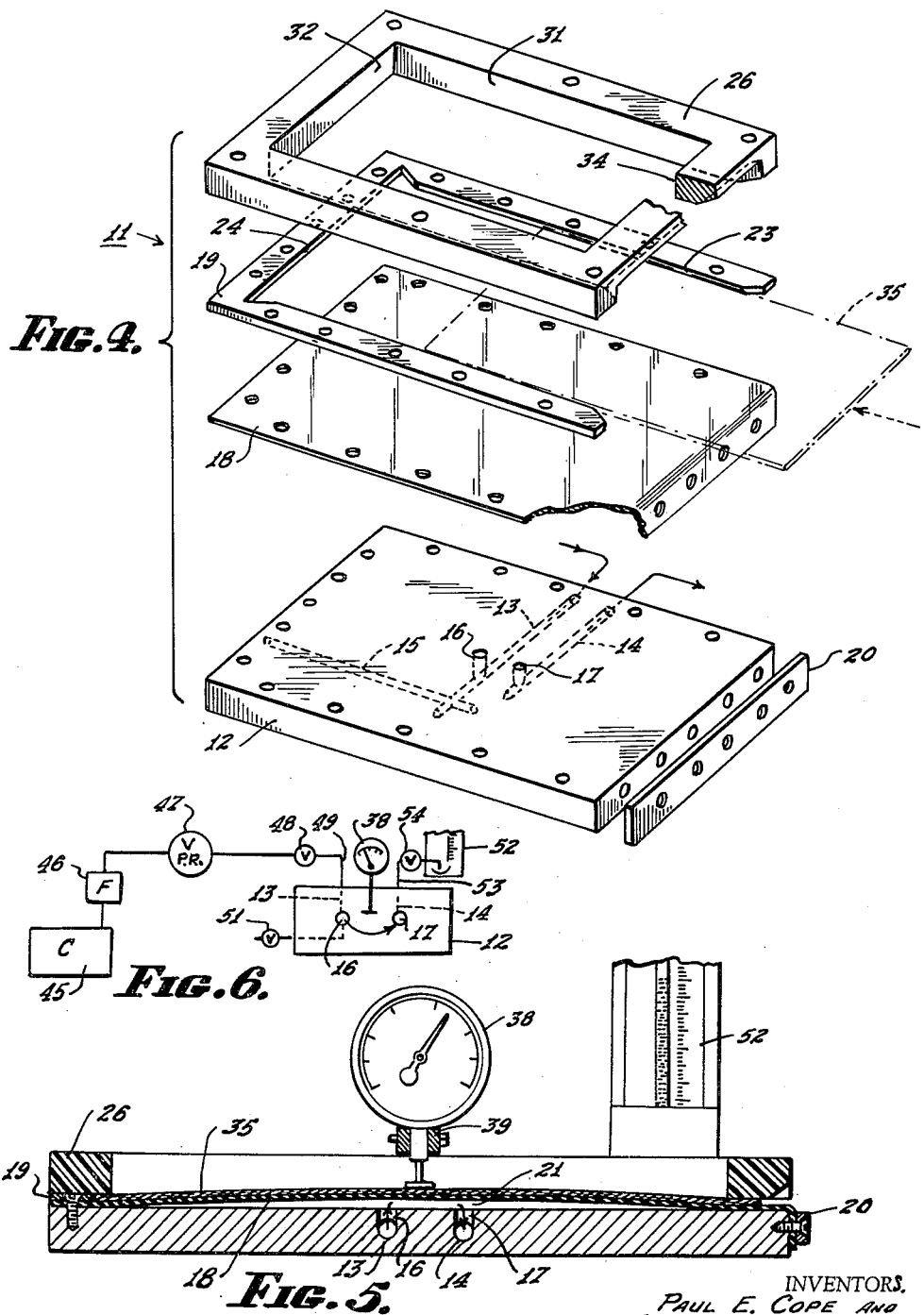
INVENTORS.
PAUL E. COPE AND
ALBERT G. STURDEVANT,
BY
Fredrick H. Braun
ATTORNEY.

United States Patent Office 3,008,328
Patented Nov. 14, 1961

3,008,328
INSTRUMENT FOR TESTING BULGE-RESISTANCE OF SHEET MATERIAL
Paul E. Cope and Albert G. Sturdevant, Cincinnati, Ohio, assignors to The Procter & Gamble Company, Cincinnati, Ohio, a corporation of Ohio
Filed Mar. 30, 1959, Ser. No. 802,820
3 Claims. (Cl. 73—100)

This invention relates to testing instruments and more particularly to an instrument for measuring the deflection of sheet material under pressure to thereby measure its resistance to bulging.

It is well known that the walls of paperboard cartons have a tendency to bulge outwardly when filled with pulverulent materials such as soap powders or detergent granules. Bulging carton walls are undesirable for a number of reasons. First of all it makes the carton more difficult to handle with conventional packaging machinery due to the dimensional variations at the mid-section of the carton. Secondly, a carton with bulged walls is unattractive in appearance and looks undesirable on the shelf of a grocery store or supermarket. In addition, bulging carton walls tend to increase the outage in the carton even though the carton contains a full measure of product. This gives the consumer the impression that the carton is underfilled. Various ways of predicting the bulge resistance of carton materials have been tried in the past. None has been completely successful and none has been generally adopted by manufacturers and users of cartons. One of the prior tests for predicting carton wall bulging has been to correlate the stiffness of the carton material to its bulge resistance. This test has not been successful since typical paperboard carton materials made by different processes or suppliers and having a given stiffness do not necessarily have the same bulge characteristics. Prior to this invention, therefore, there was a definite need for a satisfactory instrument for measuring bulge resistance of carton materials so that a carton user could inspect the cartons received for this characteristic prior to actually using the cartons.

It is a broad object of this invention to provide a new and useful instrument for measuring the resistance to bulging of carton materials.

Another object of this invention is to provide an instrument of this character which is simple, easy to operate and relatively inexpensive.

A still further object of this invention is the provision of an instrument for testing bulge resistance of carton material which is adaptable for handling samples of various size.

Briefly stated, in accordance with one aspect of the invention, the instrument comprises a mounting board for holding test samples of carton material in superposed relation to a baseplate so that fluid pressure when supplied to a fluid chamber between the test sample and baseplate is uniformly applied to one side of the test sample. Means for supplying a fluid under pressure are provided as well as means for maintaining a uniform pressure in the fluid chamber. The sample is subjected to a constant pressure and the deflection of the sample is measured by conventional means. The deflection at a given pressure is an inverse measure of the bulge resistance of the carton material.

Figure 2:
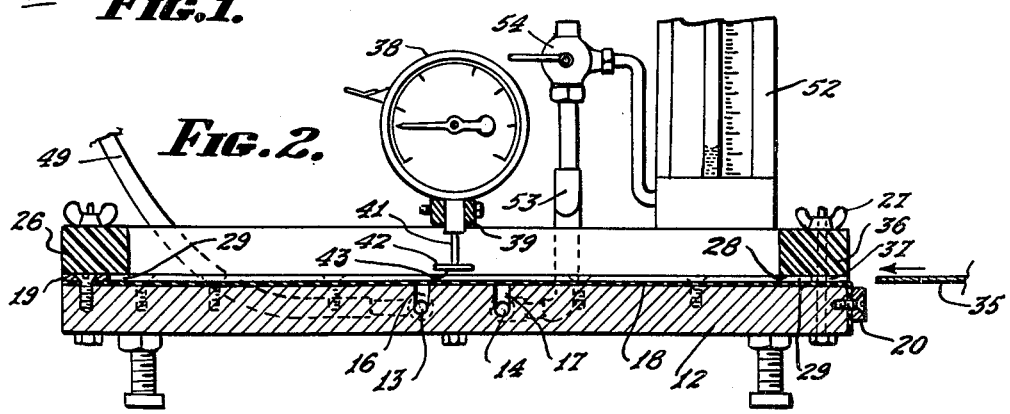
Figure 3:
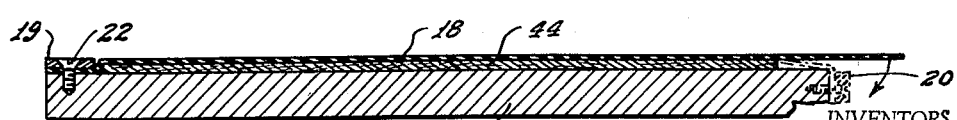

While the specification concludes with claims particularly pointing out and distinctly claiming the subject matter regarded as forming the present invention, it is believed the invention will be better understood from the following description taken in connection with the accompanying drawings in which:

FIGURE 1 is a plan view, partially in section, showing the sample mounting board and a test sample prior to its insertion in the mounting board; and FIGURE 2 is an elevation of the mounting board and test sample taken in cross-section along the lines 2—2 of FIGURE 1; and FIGURE 3 is an elevation of the baseplate showing one method of mounting a diaphragm; and FIGURE 4 is an exploded perspective view, partially in cross-section, of the mounting board of FIGURE 1; and FIGURE 5 is a cross-section of the mounting board showing a test sample in position and under fluid pressure; and FIGURE 6 is a schematic diagram of a complete testing instrument.

Referring now to the drawings and particularly to FIGURES 1, 2 and 4, there is shown a mounting board 11 for receiving and holding the paperboard samples to be tested for bulge resistance. In the particular embodiment shown, the mounting board 11 includes a baseplate 12 which is provided with internal fluid passageways 13, 14 and 15. The fluid passageways 13 and 14 are in communication with the upper surface of the baseplate 12 by means of the passageways 16 and 17. A thin flexible diaphragm 18 is mounted in relaxed fashion (as hereinafter described) over the top surface of the baseplate 12. A thin polyethylene sheet has been found to be satisfactory for the diaphragm although equivalent materials may be used. The flexible diaphragm 18 is held in place by the U-shaped spacer bar 19 and a clamping member 20 to form a fluid chamber 21 (see FIGURE 5). The U-shaped spacer bar 19 and the clamping member 20 are secured by means of countersunk screws 22. Preferably, the inside surfaces 23, 24 and 25 of the spacer bar 19 are spaced so that it will accommodate the largest sample (in area) that will be tested.

A frame member 26 attached by means of the wing nuts 27 completes the mounting board assembly. The bottom surface 28 of the frame 26, together with the surfaces 23, 24 and 25 of the spacer bar 19 and the top surface of the baseplate 12 form retaining grooves 29. The inner surfaces 31, 32, 33 and 34 of the frame 26 are so spaced that the test sample 35 is held around its periphery in the grooves 29. The frame 26 has a beveled surface 36 adjoining the slot 37 in order to facilitate the insertion of test samples 35.

In practice, it is usually desirable to have a plurality of frames 26 in which the distance between surfaces 31 and 33 and between 32 and 34 differ. In this way the instrument can be used for testing samples of various size as it is preferred to have the sample held only around its periphery in making the test. In fact, the preferred way of practicing the invention is to cut the test sample 35 so that its dimensions are about equal to the dimensions of the front panel of the carton that is to be formed from the carton material. It is then possible to select a frame 26 which has an opening slightly smaller than the overall dimensions of the sample so that the sample is held only at its peripheral edge. This makes it easier to correlate the results from the instrument with the actual bulging of a carton made from the same material.

Means are provided for measuring the deflection of the test sample 35 when the fluid chamber 21 is pressurized. A dial micrometer 38 is mounted on a support 39 which is attached to the frame 26 as shown in FIGURES 1 and 2. A sensing plunger 41 terminates in a pad 42. Preferably, the bottom surface 43 of the pad 42 when in its lowest position is in substantially the same plane as the bottom surface 28 of the frame 26. It is, of course, obvious that other conventional types of sensitive deflection measuring means may be substituted for the dial micrometer 38.

Preferably the diaphragm 18 is mounted in relaxed fashion so that the compressed fluid in the fluid chamber 21 does not encounter any resistance due to diaphragm restriction. One method of mounting the diaphragm in this fashion is shown in FIGURE 3. A temporary rectangular spacer member 44 of a size fairly close to the space within the spacer bar 19 is inserted as shown so that the diaphragm 18 is in about the same plane as the top of the spacer bar 19. The screws 22 are then turned down so that the edge of the diaphragm 18 is secured between the spacer bar 19 and the baseplate 12. The temporary spacer 44 is then withdrawn and the loose edge of the diaphragm 18 is secured by means of the clamping member 20. This leaves the diaphragm sufficiently relaxed to prevent any restricting influences which might affect the test results.

While the use of a diaphragm is preferred, it is possible to operate the instrument and test the samples without a diaphragm. In such a case the space between the test sample 35 and the upper surface of the baseplate 12 forms the fluid chamber 21. Reasonably accurate results can be obtained without a diaphragm provided the edges of the test sample are properly secured.

A schematic diagram of a complete testing instrument is shown in FIGURE 6. A conventional compressor 45 is used to supply compressed fluid, such as gas, through a filter 46, a pressure regulating valve 47, and a valve 48 to the passageway 13 in the baseplate 12. The inlet conduit 49 is connected by passageways 13 and 15 with a pressure control valve 51 attached to the baseplate 12 at the terminus of the passageway 15. A manometer 52 is attached by means of the conduit 53 and valve 54 to the passageway 14.

In using the instrument a test sample 35 is inserted through the slot 37 so that it is superposed over the diaphragm 18 with its peripheral edge within the grooves 29. Then, as shown in FIGURE 5, air or any other gaseous or liquid fluid under pressure is admitted to the fluid chamber 21 in order to bulge the test sample 35 upwardly. The pressure within the fluid chamber 21 is controlled by adjusting the amount of bleeding through the control valve 51 until a predetermined constant pressure is achieved in the fluid chamber 21 as measured by the manometer 47. A given pressure within the fluid chamber 21 will cause a certain amount of bulging in the test sample 35. The amount of bulging is measured at the approximate center of the sample by means of the dial micrometer 38. Since the bottom surface of the pad 42 is initially in substantially the same plane as the surface 28, the measured deflection does not have to be corrected for any inaccuracies caused by the manner of holding the sample.

It has been found that resistance to bulging is inversely proportional to the amount of deflection at a fixed pressure in the fluid chamber 21. It is possible to correlate the results as measured on the instrument with actual bulging of a filled carton made from the material of the test sample providing that the fabrication of the completed carton complies with generally accepted standards of quality for cutting, scoring and gluing. Thus, the instrument is a valuable tool in predicting and determining bulge resistance of paperboard carton material prior to its actual use in cartons.

While particular embodiments of the invention have been illustrated and described, it will be obvious to those skilled in the art that various changes and modifications can be made without departing from the spirit and scope of the invention and it is intended to cover in the appended claims all such changes and modifications that are within the scope of this invention.

What is claimed as new is:

1. An instrument for testing the bulge resistance of sheet material comprising a baseplate with a flexible diaphragm loosely mounted thereon, an enclosed frame, a substantially U-shaped spacer bar interposed between said diaphragm and said frame, the inner periphery of said frame overlapping said spacer bar to form retaining grooves between said baseplate and said frame, a slot formed between the baseplate and frame at the open end of the spacer bar to permit free insertion and removal of test samples within the retaining grooves, the width of said slot and said retaining grooves being substantially greater than the thickness of the test sample so that the edges of the test sample are not rigidly restrained, means for supplying fluid pressure to the underside of the diaphragm beneath a test sample inserted through said slot and held in said retaining grooves, means for maintaining said fluid at a substantially uniform pressure, and means for measuring the deflection of said sample when subjected to fluid pressure whereby the resistance to bulging of said sample material can be determined.

2. An instrument for testing the bulge resistance of sheet material comprising a structure for receiving and holding a sheet-like test sample, said structure being composed of a baseplate with a flexible diaphragm loosely mounted thereon, a substantially U-shaped spacer bar, and an enclosed frame overlying said spacer bar, the inner edges of said frame extending beyond the inner edges of said spacer bar to form a retaining groove between said frame and said baseplate for receiving a test sample within the retaining groove that can be freely inserted and withdrawn therefrom, the width of said retaining groove being substantially greater than the thickness of the test sample so that the edges of the test sample are not rigidly restrained, means for supplying a fluid under pressure to a passageway in said baseplate, an outlet leading from said passageway to the upper surface of said baseplate, the space between said upper surface and said diaphragm forming a fluid chamber, means for regulating the fluid pressure in said fluid chamber and means for measuring the deflection of said test sample whereby the bulge resistance of the test sample can be measured as a function of its deflection at a given pressure.

3. An instrument for testing the bulge resistance of sheet material comprising a baseplate, a flexible diaphragm loosely mounted on said baseplate to form a fluid chamber between the upper surface of the baseplate and the diaphragm, a spacer bar of a thickness substantially greater than that of the sheet material to be tested mounted on said diaphragm, a frame mounted on and overlapping said spacer bar, said frame being spaced from said baseplate at the open end of the spacer bar to allow the insertion of test samples into the retaining grooves formed by the baseplate, frame and spacer bar, a passageway for supplying fluid under pressure to said fluid chamber, a valve for controlling the pressure in said fluid chamber, and means for measuring the deflection of the test sample whereby the bulge resistance of the test sample can be determined by measuring its deflection at a given fluid pressure.

References Cited in the file of this patent

UNITED STATES PATENTS

| | | |
|---|---|---|
| 1,797,734 | Schopper | Mar. 24, 1931 |
| 2,332,818 | Smith | Oct. 26, 1943 |
| 2,826,910 | Bell et al. | Mar. 18, 1958 |
| 2,845,732 | Nichols | Aug. 5, 1958 |